June 7, 1949.                G. T. DOWNEY                2,472,652
                        BELLOWS SEAL FOR VALVE PLUGS
Filed May 14, 1945                                 2 Sheets-Sheet 1
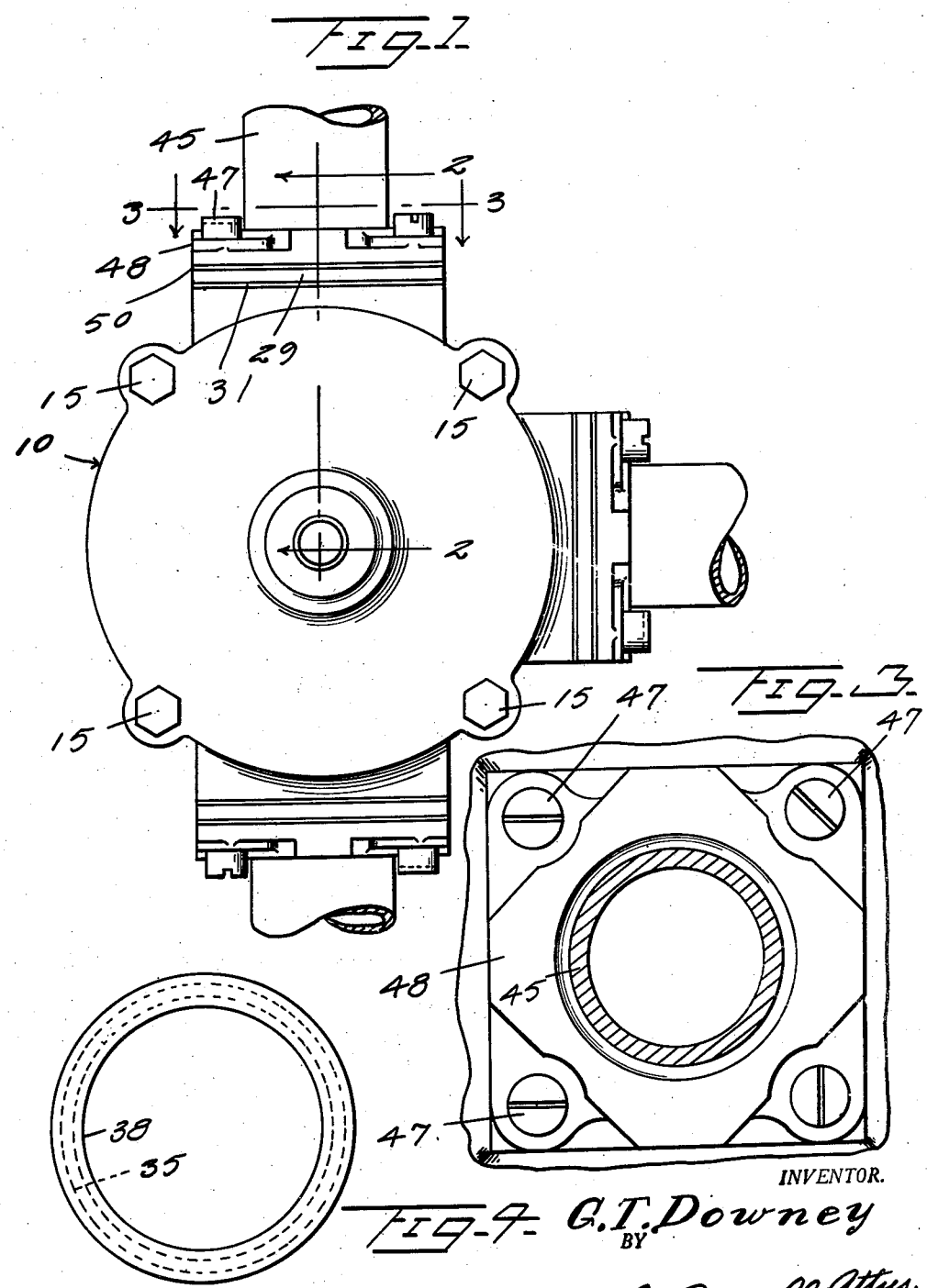

June 7, 1949.　　　　　G. T. DOWNEY　　　　　2,472,652
BELLOWS SEAL FOR VALVE PLUGS
Filed May 14, 1945　　　　　　　　　　　　2 Sheets-Sheet 2
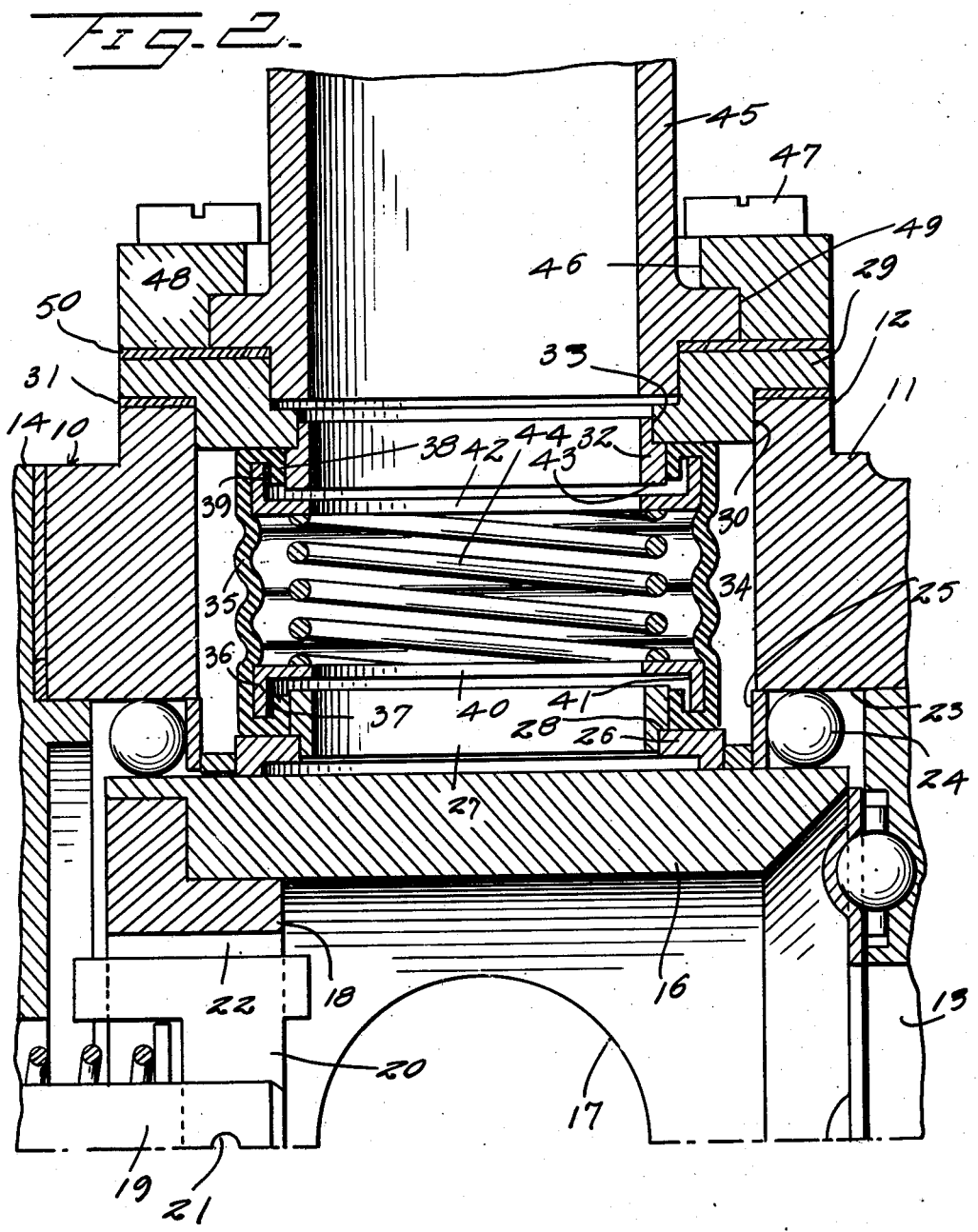
INVENTOR.
G. T. Downey
BY Kimmel & Crowell Attys.

Patented June 7, 1949

2,472,652

UNITED STATES PATENT OFFICE 2,472,652

BELLOWS SEAL FOR VALVE PLUGS

George T. Downey, Corry, Pa., assignor to Aero Supply Mfg. Co., Inc., Corry, Pa.

Application May 14, 1945, Serial No. 593,702

2 Claims. (Cl. 251—113)

This invention relates to valve structures, and more particularly to an improved seal for a rotary valve plug. This invention is an improvement over the construction disclosed in my copending application, Serial Number 556,192, filed September 28, 1944.

An object of this invention is to provide in a valve construction embodying a cylindrical valve plug and a plurality of outlet ports, an improved flexible seal between the valve plug and the several outlet ports.

A further object of this invention is to provide in a valve construction of this kind a spring-pressed valve plug seal which is formed of a resilient tubular member which is collapsible endwise and which is adapted to seal the valve plug with respect to the outlet fitting.

A further object of this invention is to provide a seal of this kind which is constructed in the form of a cylindrical bellows of copper or other flexible material which is formed with inturned opposite ends engaged by flanged rings with a spring interposed between the two flanged rings so as to maintain the opposite ends of the sealing member in contact with the valve plug and the outlet fitting.

With the foregoing objects in view, and others which may hereinafter more fully appear, the invention consists of the novel construction, combination and arrangement of parts as will be more specifically described, and illustrated in the accompanying drawings, wherein are shown embodiments of the invention, but it is to be understood that changes, variations and modifications may be resorted to which fall within the scope of the invention, as claimed.

In the drawings:

Figure 1 is a detail end elevation of a multiport valve embodying this invention.

Figure 2 is a fragmentary sectional view taken on the line 2—2 of Figure 1.

Figure 3 is a sectional view taken on the line 3—3 of Figure 1.

Figure 4 is an end elevation of the flexible valve plug seal.

Referring to the drawings the numeral 10 designates generally a valve housing embodying a cylindrical body 11, having a plurality of radially arranged outlet bosses 12, and a centrally disposed intake port 13. The opposite ends of the body 11 are closed by means of a pair of heads or end plates 14 secured by fastening members 15 to the body 11.

A cylindrical valve plug 16 is rotatably disposed in the body 11, and has an open end thereof facing the inlet port 13. The valve plug 16 is provided with an outlet port 17, which is adapted, upon rotation of the valve plug 16, to be disposed in registry with a selected one of the several bosses 12. The valve plug 16 has mounted in the end thereof, opposite from the intake port, a plate 18 and a valve stem or valve plug shaft 19 is coupled to the plate 18 by means of a key member 20 which is fixed by means of a pin 21 in the inner end of the stem or shaft 19 and engaged in a slot 22 which is formed in the plate or wall 18. The plug 16 has interposed between the outer surface thereof and the inner surface 23 of the body 11, a plurality of anti-friction balls 24. There is one series of these balls 24 adjacent each end of the plug 16.

An inner ring 25 is disposed about the plug 16, and holds the balls 24 against inward movement along the plug 16. A flanged sealing member 26 is disposed in alinement with the outlet boss 12 having a configuration at its inner edge to snugly engage against the peripheral surface of the valve plug 16.

A cylindrical member 27, having a rabbet 28 at its inner end receives the flange of the inner sealing member 26, and extends axially outwardly therefrom.

A plate 29 engages the outer end of the outlet boss 12, being provided with a rabbet 30 within which the outer end of the boss 12 is adapted to engage and a sealing gasket 31 is interposed between the plate 29 and the outer end of the boss 12. A cylindrical member 32 which is formed with a rabbet 33, engages the inner portion of the plate 29. The body 11 is formed with an outlet port 34 communicating with the opening 17 of the plug 16 when the latter is turned to registry therewith.

In order to provide a sealing means between the plate 29 and the inner sealing member 26, I have provided a flexible tubular sealing member 35. The sealing member 35 is constructed in the form of a corrugated or bellows-like tube, and is formed at its inner end with an outwardly extending L-shaped flange 36 forming an annular channel 37. The outer end of the flexible member 35 is provided with a reversely directed L-shaped member 38, forming a channel 39. A pressure ring 40 having an annular flange 41 which engages in the channel 37 is adapted to bear against the L-shaped inner end 36 of the tubular member 35 and a second ring 42, having an annular flange 43 which engages in the channel 39, is adapted to maintain the outer end of the flexible member 35 in sealing contact with the inner face of the plate 29.

The L-shaped inner end 36 engages about the cylindrical member 27, and the L-shaped outer end of the sealing member 35 engages about the cylindrical member 32. An expansible spring 44 is interposed between the two rings 40 and 42, and acts to maintain these rings under necessary tension so that the reverted opposite ends of the sealing member 35 will be maintained in sealing engagement with their related elements.

An outlet fitting, in the form of a cylindrical nipple 45, having an annular flange 46, is secured by fastening members 47, to the plate 29. A rabbeted ring or plate 48, having a rabbet 49 within which the flange 46 engages, is interposed between the fastening members 47, and the plate 29, and is adapted to hold the fitting 45 on the plate 29. A sealing gasket 50 is interposed between the ring or plate 48, and the plate 29.

In view of the construction of the valve plug 16, when intake port 13 is connected to a source of fluid supply the fluid will enter the intake port 13 and engage within the inside of the valve plug 16. Due to the fact that the plug 16 is not thoroughly sealed within the body 11, the fluid in the plug 16 may also enter the space in each outlet boss and outlet port 34 around the outside of the flexible sealing members 35. However, the sealing members 35 each prevent any fluid from flowing to an outlet port from the port 34 until plug 16 has been rotated to position the outlet port 17 in registry with the selected outlet port. At this time the port 17 will be in registry with the inner ring 27 forming part of the sealing assembly and the fluid may then flow through the ring 27 and the spring 44 to the outlet fitting 45.

This flexible seal will permit a very close fitting between the rotary valve plug, and the outlet port and will provide for the ready replacement of a worn seal.

What I claim is:

1. In a valve assembly including a housing formed with a central intake port, a plurality of outlet ports, and a cylindrical valve plug opening at one end in the direction of said intake port and formed with a discharge port for registry with a selected outlet port; a sealing means for each outlet port comprising an expansible tubular member formed with inwardly extending reverted opposite ends, a ring at each end of said tubular member, a cylindrical flange carried by each ring engaging in the annular channel formed by said reverted ends, and an expansible spring between said rings interiorly of said tubular member and constantly urging the latter to expanded sealing position with respect to said outlet port and said valve plug.

2. In a valve assembly including a housing formed with a central intake port, a plurality of outlet ports, and a cylindrical valve plug opening at one end in the direction of said intake port and formed with a discharge port for registry with a selected outlet port, a sealing means for each outlet port comprising a flexible expansible tubular member formed with inwardly extending reverted ends providing channels at each end of said member, a ring within said member at each end thereof, a cylindrical flange on each ring engaging in said channel, and an expansible spring between said rings constantly urging said member to expanded sealing position with respect to said outlet port and said valve plug.

GEORGE T. DOWNEY.

REFERENCES CITED

The following references are of record in the file of this patent:

UNITED STATES PATENTS

| Number | Name | Date |
| --- | --- | --- |
| 2,222,654 | Donaldson | Nov. 26, 1940 |
| 2,375,633 | Downey | May 8, 1945 |
| 2,390,201 | Bredenbeck | Dec. 4, 1945 |
| 2,404,816 | Snyder | July 30, 1946 |